(12) United States Patent
Jain et al.

(10) Patent No.: US 10,559,223 B2
(45) Date of Patent: Feb. 11, 2020

(54) FOOD DESCRIPTION PROCESSING METHODS AND APPARATUSES

(71) Applicant: Under Armour, Inc., Baltimore, MD (US)

(72) Inventors: Aadhar Jain, Mountain View, CA (US); Chul Lee, Mountain View, CA (US); Bryan Levine, Oakland, CA (US)

(73) Assignee: Under Armour, Inc., Baltimore, MD (US)

( * ) Notice: Subject to any disclaimer, the term of this patent is extended or adjusted under 35 U.S.C. 154(b) by 443 days.

(21) Appl. No.: 14/480,401

(22) Filed: Sep. 8, 2014

(65) Prior Publication Data

US 2016/0071431 A1    Mar. 10, 2016

(51) Int. Cl.
*G06F 16/00*    (2019.01)
*G09B 19/00*    (2006.01)
*G06F 16/22*    (2019.01)

(52) U.S. Cl.
CPC ......... *G09B 19/0092* (2013.01); *G06F 16/22* (2019.01)

(58) Field of Classification Search
CPC ................ G06F 17/30445; G06F 17/30303
See application file for complete search history.

(56) References Cited

U.S. PATENT DOCUMENTS

| | | | | |
|---|---|---|---|---|
| 6,478,736 B1* | 11/2002 | Mault | ................. | G16H 15/00 600/300 |
| 7,966,291 B1* | 6/2011 | Petrovic | ................. | G06F 16/951 707/641 |
| 2004/0194141 A1* | 9/2004 | Sanders | ............. | H04N 5/44543 725/53 |
| 2006/0136462 A1* | 6/2006 | Campos | ............. | G06F 16/2465 |
| 2007/0118405 A1* | 5/2007 | Campbell | .......... | A61B 5/14532 705/2 |
| 2008/0040313 A1* | 2/2008 | Schachter | ........... | G06F 16/9562 |
| 2008/0091705 A1* | 4/2008 | McBride | ............. | G06F 19/3475 |
| 2009/0099873 A1* | 4/2009 | Kurple | ................... | G06Q 50/24 705/3 |
| 2010/0005048 A1* | 1/2010 | Bodapati | ................ | G06F 16/20 706/47 |
| 2010/0169361 A1* | 7/2010 | Chen | ..................... | G06F 16/285 707/769 |
| 2011/0119161 A1* | 5/2011 | Van Treeck | ............ | G06Q 30/02 705/27.2 |
| 2012/0005222 A1* | 1/2012 | Bhagwan | ................. | G06K 9/18 707/769 |
| 2012/0023107 A1* | 1/2012 | Nachnani | .......... | G06F 16/24532 707/748 |

\* cited by examiner

*Primary Examiner* — Apu M Mofiz
*Assistant Examiner* — Farhad Agharahimi
(74) *Attorney, Agent, or Firm* — Maginot, Moore & Beck LLP

(57) ABSTRACT

Disclosed embodiments include apparatuses, methods and storage media associated with standardization or normalization of a food description. In embodiments, an apparatus may include one or more processors and a food data pre-processing engine. The food data processing engine may, when operated by the one or more processors, cause the apparatus to receive a description of a food item, process the description to generate a standardized or normalized description for the food item, and store the standardized or normalized description in a food record in a food data storage arrangement of a fitness management system. Other embodiments may be described and claimed.

25 Claims, 7 Drawing Sheets

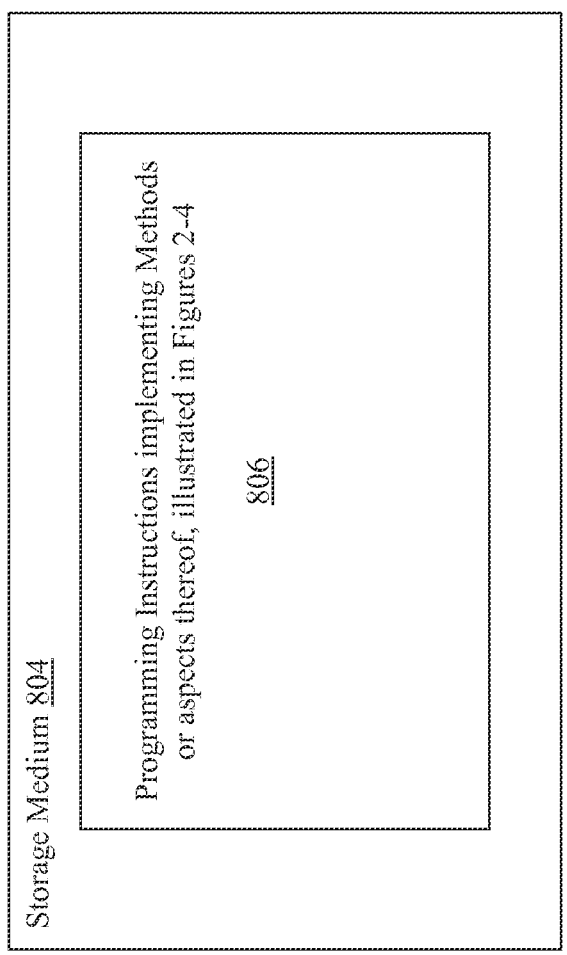

FOOD DESCRIPTION PROCESSING METHODS AND APPARATUSES

TECHNICAL FIELD

The present disclosure relates to the field of data processing. More particularly, the present disclosure relates to food description processing.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Historically, when gathering data from multiple sources either the various sources may need to be aware of any formatting requirements there may be for the data, or the entity performing the gathering may need to know how the data is formatted in the individual sources. If neither of the above is the case, the entity gathering the data may be limited as to how the data may be able to be utilized. Such a scenario may be exacerbated by the collection of data from users where any number of users may enter data and the users may not know, or really even care, what format the data is to be entered in. So long as the data serves the individual user's purpose, the user may be satisfied. Specifically, in scenarios where the data may concern descriptions of foods, including nutritional information, the data entered by various users may vary dramatically. As a result, an entity wishing to utilize the user entered data may have to manually modify individual user entries to conform to the desired data format or may have to live with the format of the data as the user entered it.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 8 illustrates an example storage medium having instructions to cause a computing device to practice aspects of interactive messaging, according to various embodiments.

DETAILED DESCRIPTION

Figure 1:
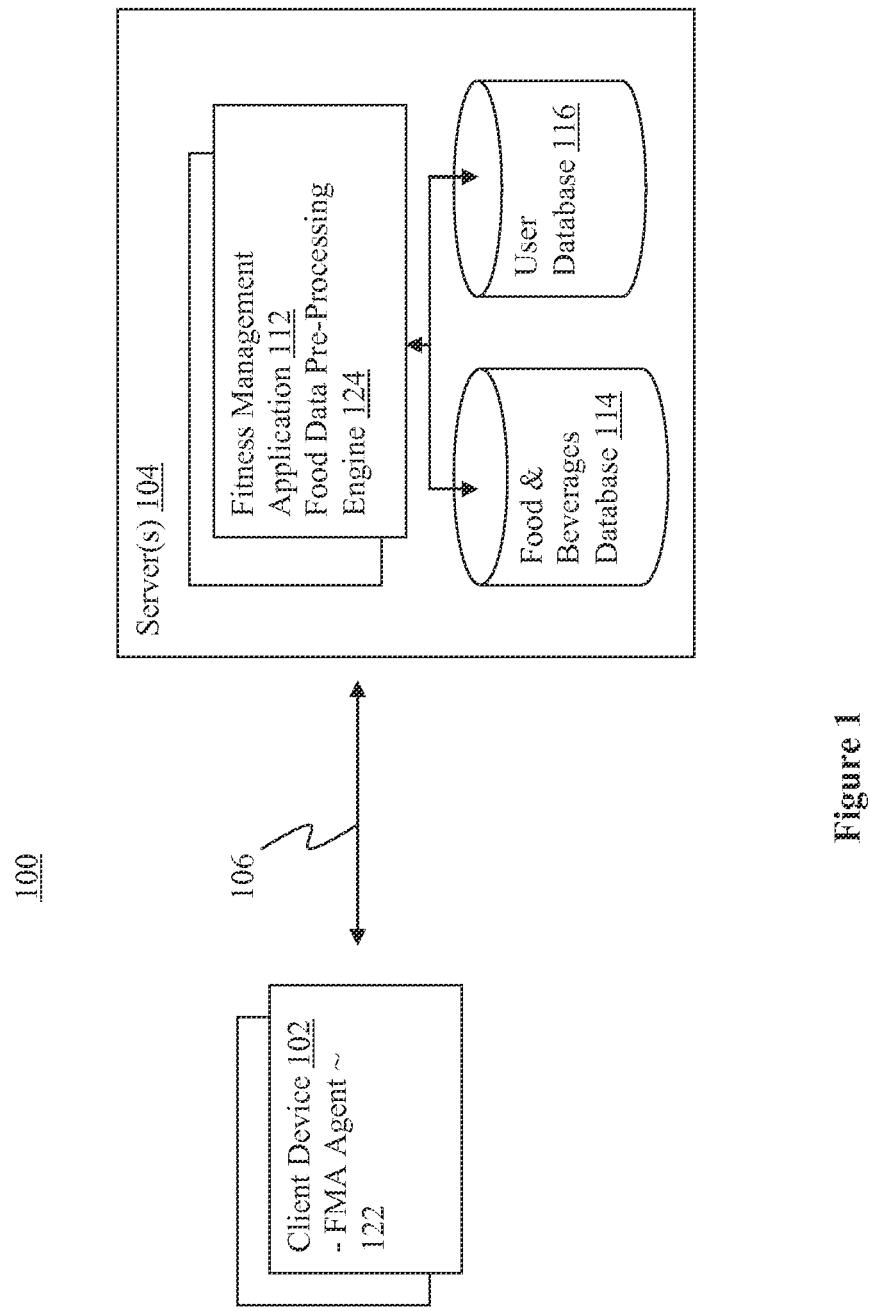
FIG. 1 illustrates a fitness management system suitable for practicing the present disclosure, according to the various embodiments.

Disclosed embodiments include apparatuses, methods and storage media associated with food description processing.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Referring now to FIG. 1, wherein a fitness management system, according to the various embodiments, is illustrated. As shown, fitness management system (FMS) 100 may include any number of client devices (e.g., client device 102) and one or more server(s) 104 coupled with each other. Server(s) 104 may host a fitness management application (FMA) 112, including a number of databases, e.g., food and beverages database 114 and user database 116, configured in accordance with the teachings of the present disclosure. Whereas client device 102 may include a client side agent 122 of FMA 112 configured to access and interact with FMA 112, to enable a user of the client device 102, among other things, to develop a fitness plan that may include a nutritional, or food and beverage, budget, and monitor the progress towards meeting the fitness plan. For example, a user may develop a fitness plan including a caloric budget designating a number of calories the user would like to consume in a day. For those attempting to lose weight the designated number of calories may be a maximum number the user may like to stay below, while, for those looking to gain weight, the designated number of calories may be a minimum number of calories the user may like to stay above. In some embodiments, the user may be able to further designate the nutritional sources for these calories. For example, if a user would like to limit the user's caloric intake from fat, the user may designate a maximum budget of the user's calories from fat. As another example, if the user is looking to gain or maintain muscle mass the user may designate a minimum budget of the user's caloric intake that should come from proteins.

Once such a fitness plan is developed, the user may utilize client side agent 122, in conjunction with FMA 112, to monitor the user's intake of foods and/or beverages. This may be accomplished by the user entering individual food and/or beverage items that the user consumes along with quantities of these food and/or beverage items consumed. In some instances the food and/or beverage item may already have a food record in food and beverages database 114. In such instances, the user may merely select the food and/or beverage item from a list of food and/or beverage items and then enter quantity consumed. FMA agent 122, in conjunction with FMA 112, may then be configured to incorporate the consumption of the food and/or beverage item into the user's nutritional budget based upon a description of the food item in the food record of the food and beverages database 114. Such a food record may include nutritional information, such as that discussed below. In some instances the food and/or beverage item may not have an existing record, or the user may not be able to find the appropriate food record for the food and/or beverage item. In such instances, the user may enter the information that the user knows about the food including a food identifier, brand name, country of origin, a description including any nutritional information the user knows, and any additional description the user would like to enter for the food. Such information may then be incorporated into the user's nutritional budget as well as incorporated into food and beverages database 114.

In embodiments, server(s) 104, except for FMA 112 and databases 114-116, may be any one of a number of computer servers, real or virtual, known in the art, including, but not limited to, servers available from Dell Computing of Austin, Tex. or Hewlett Packard of Palo Alto, Calif. In embodiments, FMA 112 may include food data pre-processing engine 124, hereinafter referred to simply as "pre-processing engine 124." Whereas food & beverages database 114 may include food and beverage items, including a description of the food and beverage items that may include nutrient information associated with the food and beverage items, as well as recipes and ingredient items. Examples of nutrient information may include, but are not limited to, amounts of protein; sugar; various fats, including trans-fat, saturated fat, etc.; sodium; carbohydrates, both complex and simple; calcium, various vitamins and/or calories per serving. In some embodiments, server(s) 104 may represent a cloud computing environment where each of FMA 112, pre-processing engine 124, food and beverages database 114, and user database 116 may reside, individually or in any combination, on servers, real or virtual, of the cloud computing environment.

As discussed above, in some embodiments, a user may enter information regarding a food and/or beverage item to be incorporated into the user's nutritional budget. This user entered information may also be incorporated into food and beverages database 114 and may enable food and beverages database 114 to grow through user entered information. Such user entered information may be referred to as crowdsourced information. A problem with this user entered information is that it may not be formatted in a manner consistent with other food records contained within food and beverages database 114. In some embodiments, such inconsistently entered information may result in a number of duplicate food records for the same food and/or beverage item. In addition, the inconsistency of the information may make it difficult for a user to find a specific food and/or beverage item that is contained within the database, and, as a result, the user may enter duplicate, or nearly duplicate, information and lose any efficiency that would be gained by utilizing the previously entered information. To combat such inconsistently entered food and/or beverage information, pre-processing engine 124 may be configured to process the user entered food and/or beverage information to standardize and/or normalize the information before entry of the information as a food record in food and beverages database 114

In embodiments, client device 102 may be any one of a number of stationary or portable electronic devices known in the art, including, but not limited to, desktop computers (e.g. those available from Dell Computing of Austin, Tex.), smartphones, computing tablets, laptop computers, electronic readers, personal digital assistants, and so forth, such as Galaxy S4 from Samsung Electronics of Seoul, Korea, or iPad from Apple Computer of Cupertino, Calif. In embodiments, one or more portable computing devices 102 may be a wearable computing device, e.g., a smart watch, smart eyeglasses (e.g., Google Glass from Google of Mountain View, Calif.), and so forth. In embodiments, FMA agent 122 may be a web-based application configured to operate in a generic browser, such as Internet Explorer, available from Microsoft Corp., of Redmond, Wash., or Safari from Apple Computer of Cupertino, Calif. In other embodiments, FMA agent 122 may be a stand-alone client side application, e.g., a mobile app configured to run on a smartphone such as, for example, a mobile app available through the App Store from Apple Computer of Cupertino, Calif.

In embodiments, client device 102 and server(s) 104 may be communicatively coupled with one another via communication link 106 over one or more wired and/or wireless, private and/or public networks, including the Internet. Client device 102 and server(s) 104 may be configured with the appropriate networking communication interfaces. An example of a wired communication interface may include, but is not limited to, Ethernet, while examples of wireless communication interfaces may include, but are not limited to, near field communication (NFC), Bluetooth, WiFi, 4G or 5G LTE. In between the communication interfaces of client devices 102 and server(s) 104 may be any number of gateways, routers, switches, based stations, and so forth.

Hereinafter, for ease of description, including the claims, the term "food" will be used to mean "food and/or beverage," unless the context clearly indicates otherwise.

Figure 2:
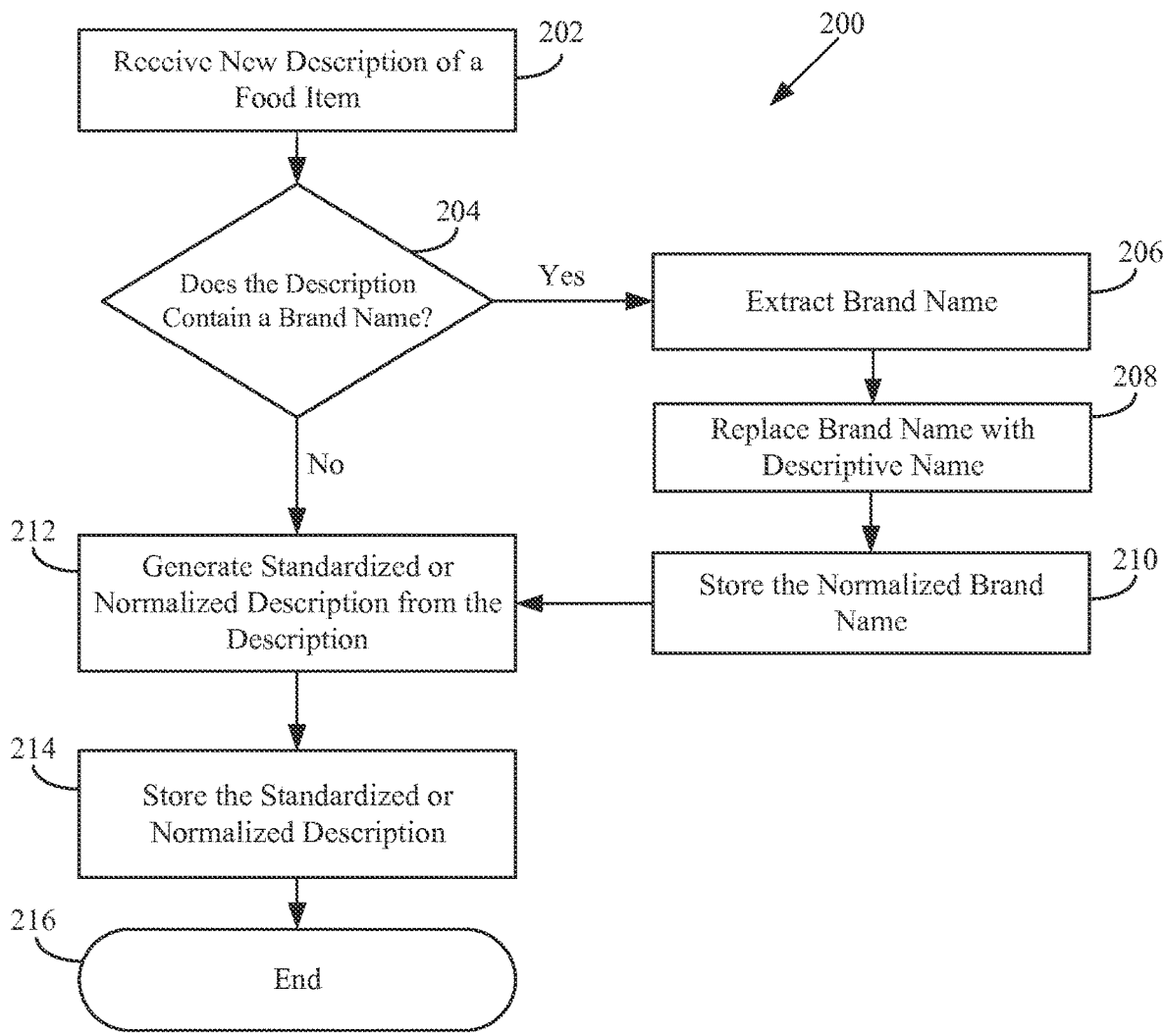
FIG. 2 illustrates example operation flow of processing a food description, according to the various embodiments.

FIG. 2 illustrates an example process flow for processing a description of a food item by pre-processing engine 124 of FIG. 1, in accordance with various embodiments of the present disclosure. The process flow may begin at block 202 where the description of the food item may be received by the pre-processing engine. Such a description may be received by the pre-processing engine, for example, from FMA agent 122 of client device 102 of FIG. 1 via communication link 106 of FIG. 1. As discussed above in reference to FIG. 1, the description may be entered by a user of computing device 102, for example, to describe a food and/or beverage item that the user consumed to be incorporated into a fitness plan the user developed.

In some embodiments, at block 204 the pre-processing engine may analyze the description to determine whether the description contains a brand name. This may be accomplished by the pre-processing engine tokenizing the description, including any brand name the description may contain. As used herein, tokenizing may refer to the process of dividing the text of the description into smaller components, or tokens, to be processed. The tokens may be individual characters, words, groups of words (e.g., every three words), or groups of characters (e.g., every five characters).

Once the description has been tokenized it may be processed by the pre-processing engine to standardize the description. This may be accomplished, for example, by the pre-processing engine removing special characters, spaces, etc. from the description. A list of normalized brand names, which may be stored, for example, as a table in the food and beverages database, may then be retrieved by the pre-processing engine which may then tokenize and standardize the list of normalized brand names in the same manner as the description. Standardizing the list of normalized brand names in the same manner as the description may enable a more accurate search of the description for the normalized brand names. In some embodiments, each brand name in the list of normalized brand names may also have commonly used non-normalized brand names associated therewith. For example, if the normalized brand name is McDonald's, then the non-normalized brand names associated therewith may be Mcdonalds, McDonalds, McDonald, etc. In such embodiments, the non-normalized brand names may also be standardized in the same manner as the normalized brand names.

Once the description, normalized brand names, and, in some embodiments, the non-normalized brand names associated with the normalized brand names, have been tokenized and standardized, the individual tokens of the normalized and non-normalized brand names may be searched to determine whether the description contains a brand name (e.g., through a hashing process). If an exact match to one of the normalized or non-normalized brand names is not found, then, in some embodiments, the process may proceed to determine if a brand name within a threshold of similarity is contained within the description. This procedure may also result in the correction of brand names that may be misspelled by the user. For example, misspelled brand "P. F. Chnag's" will fall within the threshold of similarity of the brand "P. F. Chang's", and may be corrected in the process. The threshold of similarity may, in some embodiments, be based on a Damerau-Levenshtein distance analysis which may provide a count of the number of operations it would take to transform one or more tokens of the description into one of the normalized or non-normalized brand names. Such a count may commonly be referred to as a distance, or modified edit distance, between the one or more tokens and the normalized or non-normalized brand name. If the distance between the normalized or non-normalized brand names and the one or more tokens of the description are within a predefined distance from one another, then the one or more tokens may be determined to be within a threshold of similarity to the normalized or the non-normalized brand name. In such an instance, the determination in block 204 may be in the affirmative and the process may proceed to block 206. In other embodiments, such an analysis may be accomplished using a Jaccard index, or Jaccard coefficient analysis, which may take the one or more tokens and determine a measure of the overlap. An example of such an analysis is discussed further below in reference to FIG. 3. If a brand name is not found within the description then the process may proceed to block 212.

At block 206, the one or more tokens may be extracted from the description. In some embodiments, this extraction may include the extraction of one or more additional tokens either before or after the one or more tokens of the brand name. For example, if the description states "sandwich from McDonalds" the "from" contained in the description may be extracted in addition to the brand name. In some embodiments, such additional tokens may be automatically extracted by designating that a token leading into a brand name and/or a token following a brand name are to be extracted along with the brand name. In other embodiments, the tokens before and after the brand name may be analyzed to determine if the word is a common leading or trailing word (e.g., a preposition) to be extracted. Such common leading or trailing words may be contained in a list of leading and/or trailing words stored, for example, in a table of the food and beverages database. In some embodiments, the normalized brand name that is within a threshold of similarity may be associated with the description to be recorded as the brand name for the description being processed (e.g., brand name of food record 1 of FIG. 6).

At block 208, in some embodiments, the brand name extracted from the description may be replaced with a descriptive name. For example, if the normalized brand name is "French's" the extracted brand name may be replaced with a descriptive name, such as mustard. Such a descriptive name may be associated with the normalized brand name via the table of normalized brand names, for example, discussed above. It will be appreciated, that block 208 may be optional and, as a result, may be omitted in some embodiments. At block 210, the normalized brand name may be stored, for example as part of a food record in food and beverages database 114 of FIG. 1, after which the processing may proceed to block 212. It will be appreciated that, in some embodiments, the procedures of blocks 204-210 may be optional and, as a result, may be omitted from the processing performed by the pre-processing engine.

At block 212, pre-processing engine may process the description to generate a standardized and/or normalized description for the food item. This may be accomplished by first standardizing the description of the food item for processing. Such standardization may begin by cleaning the description. Such a cleaning may include the removal of stop words designated, for example, by a list of stop words contained within a table of the food and beverages database. The cleaning may also include the removal of punctuation or special characters from the description. In addition, the cleaning process may include the removal of any unnecessary delimiters, such as, for example, removal of consecutive spaces. In some embodiments, the cleaning may also include removal of "bad" keywords that may be defined, for example, in a table of bad keywords stored in the food and beverages database. Such bad keywords may be for example, profanities, vulgarities, etc.

Once the description has undergone the above cleaning process, the description may be further standardized and/or normalized by removing any usernames from the description. As used herein, standardized may refer to standardization of a single instance of a description independent of any other description instances, while normalized may refer to normalization of a single instance with respect to other description instances contained with a set of description instances (e.g., with respect to the clusters discussed below or with respect to other records within the food and beverages database). This may be accomplished by utilizing a user database (e.g., user database 116 of FIG. 1) to construct a username dictionary to utilize in analyzing the description for any usernames. Such an analysis and removal may be performed in a similar manner to the analysis and removal of brand names described above in reference to FIG. 2. In some embodiments, the standardization may also include the analysis and removal of any country names contained within the description. Again, the removal of the country names may be performed in a similar manner to the analysis and removal of brand names described above. In some embodiments, any country name contained within the description may be stored in a country field of a food record for the description. In some embodiments, the capitalization may also be standardized as part of the standardization process. Standardizing the capitalization may involve, for example, converting all capital letters to lowercase. At block 214 pre-processing engine may cause the standardized and/or normalized description of the food item to be stored in a fitness management system, such as FMS 100 of FIG. 1. In embodiments, this may include storage of the description of the food item, the brand name of the food item, the country of the food item, and/or any other pertinent information with respect to the food item, as a food record in the food and beverages database.

Figure 3:
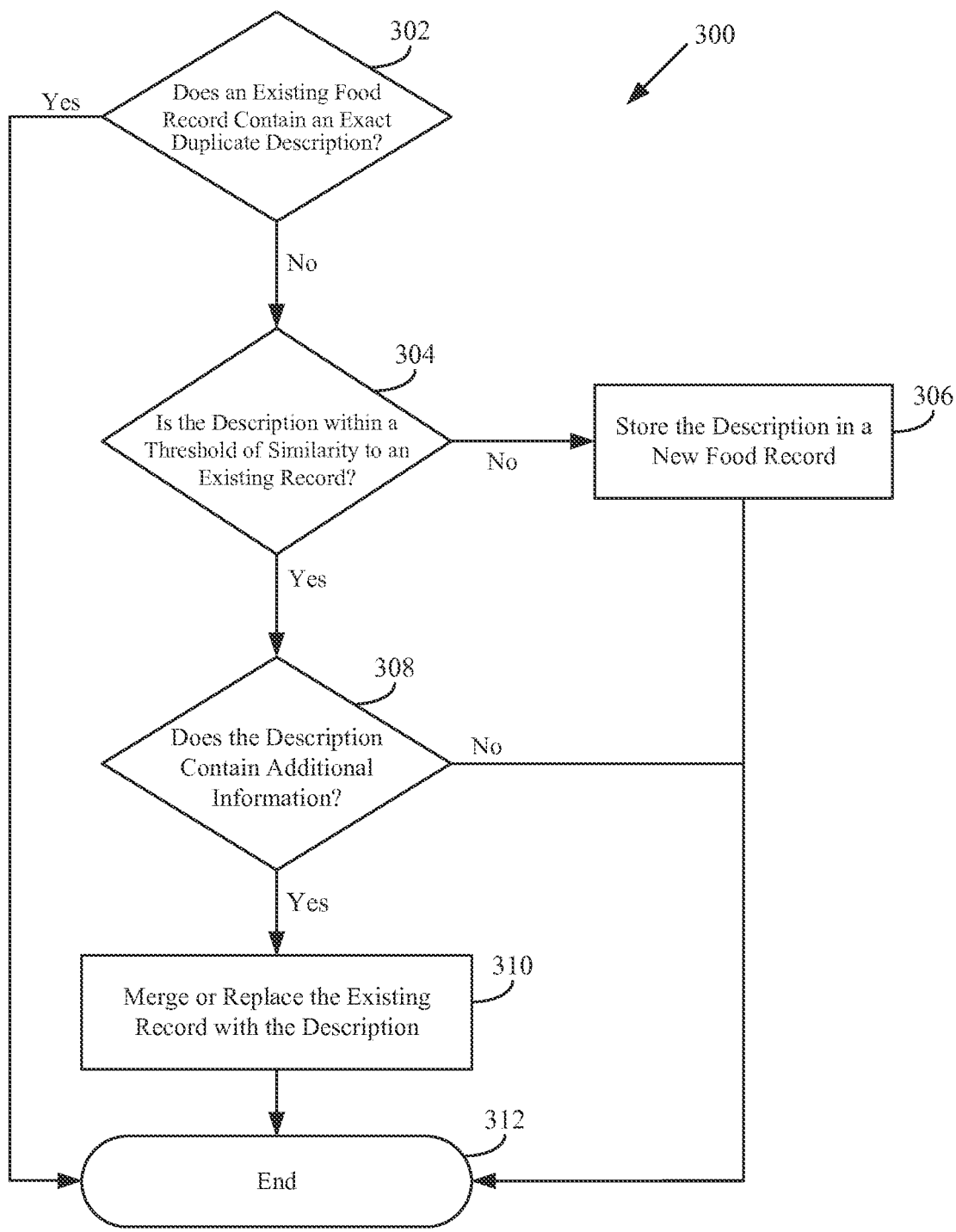
FIG. 3 illustrates an example operation flow of storing a standardized and normalized food description, according to various embodiments.

FIG. 3 illustrates an example process flow 300 store a standardized and/or normalized food description, in accordance with various embodiments of the present disclosure. In some embodiments, when storing a description of a food item, it may be desirable to determine whether a duplicate, or nearly duplicate, description for the food item already exists. This may prevent duplicate, or nearly duplicate, descriptions of the same food item from taking up unnecessary space in a storage mechanism, such as food and beverages database 114 of FIG. 1, in addition to reducing the amount of noise contained within food item search results that may be caused by duplicate, or near duplicate, records for the same food items. Process 300 depicts an illustrative process that may prevent or limit the storage of duplicate, or near duplicate, descriptions of the same food item. Such a process may be carried out as part of block 216 of FIG. 2.

Process 300 may begin at block 302 where pre-processing engine may determine whether an existing food record contains an exact duplicate description for the same food item. This may be accomplished by taking the standardized and/or normalized description and constructing n-grams (or k-shingles) from the standardized or normalized description. As used herein, n-grams may be a contiguous sequence of n items from the description. The items may be phonemes, syllables, letters, words, etc. K-shingles on the other hand, may refer to k contiguous subsequences of the n-grams. For example, consider a food item 'A' where the standardized description of food item A is "Chicken sandwich with white onions and peppers." A three shingle set for food item A may be {[Chicken, sandwich, with], [sandwich, with, white], [with, white, onions], [onions, and, peppers]}. If a food record already exists that contains an exact duplicate description, (e.g., has the exact same shingle set as food item A) then the process may proceed to block 312 where process 300 may end and the description being stored may be discarded. If an existing food record does not contain an exact duplicate description, then the process may proceed to block 304.

At block 304, pre-processing engine may determine whether an existing food record contains a description for a food item that is within a threshold of similarity of the description of the food item being processed. The threshold of similarity may, as described above in reference to the brand name analysis, be based on a Damerau-Levenshtein distance analysis which may provide a count of the number of operations it would take to transform the description being processed into a description of an existing food record. Such a count may commonly be referred to as a distance between the description being processed and the description of the existing food record. If the distance between the description being processed and the description of the existing food record are within a predefined distance from one another, then the description being processed and the description of the existing food record may be determined to be within a threshold of similarity to one another. In such an instance, the determination in block 304 may be in the affirmative and the process may proceed to block 308. In other embodiments, this may be accomplished utilizing a Jaccard index, or Jaccard coefficient analysis, which may be depicted by the equation $$J(A, B) = \frac{|A \cap B|}{|A \cup B|},$$

where A may be the shingle set of A and B may be the shingle set of B. In such an embodiment, returning to the above example, consider a food item 'B' where the standardized description of food item B is "Chicken sandwich with onions and peppers." A three shingle set for food item B may be {[Chicken, sandwich, with], [sandwich, with, onion], [with, onions, and], [onions, and, peppers]}. Utilizing the Jaccard coefficient analysis yields $$J(A, B) = \frac{|A \cap B|}{|A \cup B|} = \frac{3}{6} = .5.$$

In addition, the Damerau-Levenshtein distance between food item A and food item B would be 5, because the two descriptions are identical other than the word "white" which would attribute 5 characters to the Damerau-Levenshtein distance. If the threshold of similarity is, for example, 0.4, for the Jaccard coefficient example, or, for example 8, for the Damerau-Levenshtein example, then the determination of block 304 may be in the affirmative and the processing may proceed to block 308. If, however, the determination of block 304 is in the negative, then the process may proceed to block 306 where the description, along with brand, country, etc. may be stored into a new food record of the food and beverages database. After the description of the food item being processed is stored at block 306, the process may proceed to block 312 where the process may end.

At block 308 pre-processing engine may make a determination as to whether the description for the food item being processed contains additional information not contained within the description of the existing record. For example, a user may have previously entered a description omitting the amount of sodium contained within a serving of the food item and the description being processed may contain this information. If the description for the food item being processed does not contain additional information, then the process may proceed to block 312 where the process may end. If, however, the description for the food item being processed does contain additional information, then the process may proceed to block 310 where the pre-processing engine may either merge the additional information into the description contained within the existing record or replace the existing record with the description of the food item being processed. The description being processed and the description of the existing record may be merged, for instance, by incorporating the additional information contained within the description being processed into the description of the existing record. Returning to the example above, such a merge may be accomplished by adding the amount of sodium contained within the description being processed to the description of the existing record. Once procedure 310 is complete, the process may proceed to block 312 where the process may end.

Figure 4:
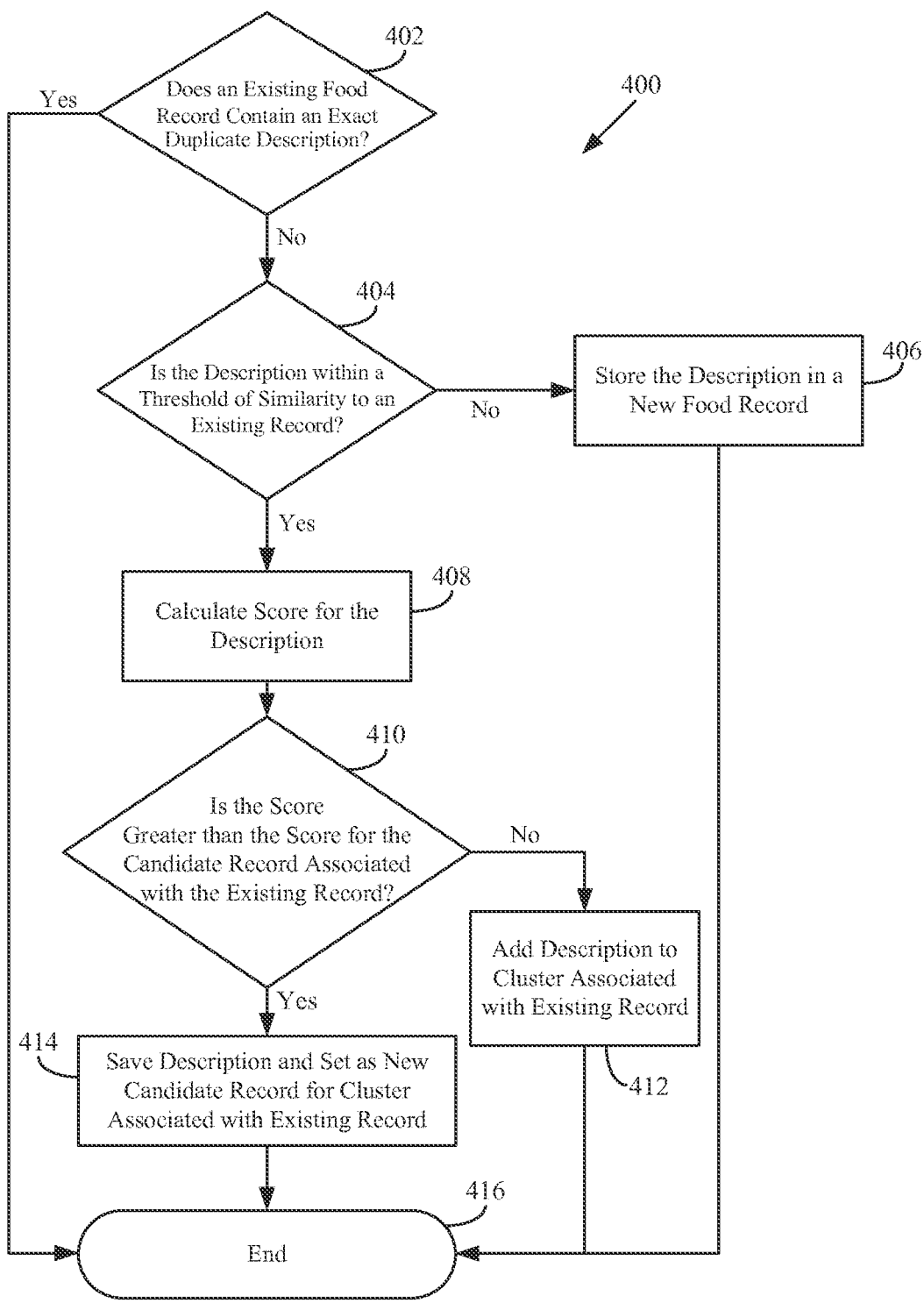
FIG. 4 illustrates another example operation flow of storing a standardized and normalized food description, according to various embodiments.

FIG. 4 illustrates another example process flow 400 of storing a standardized and normalized food description, according to various embodiments. Process flow 400 differs from process flow 300 of FIG. 3 in that records containing similar descriptions for the same food item may, in some embodiments, be organized into clusters (e.g., the clusters discussed below in reference to FIG. 5). In such embodiments, exact duplicates of existing food records may still be discarded, however, a new food description that is within a threshold of similarity to a description of an existing food record may be added to a cluster associated with the existing food record. Such an embodiment is discussed in further detail below.

Process 400 may begin at block 402 where pre-processing engine may determine whether an existing food record contains an exact duplicate description for the same food item. This may be accomplished in a similar manner to that described above in reference to process 302 of FIG. 3. If a food record already exists that contains an exact duplicate description, then the process may proceed to block 416 where process 400 may end and the description being stored may be discarded. If an existing food record does not contain an exact duplicate description, then the process may proceed to block 404.

At block 404, pre-processing engine may determine whether an existing food record contains a description for a food item that is within a threshold of similarity of the description of the food item being processed. As discussed above in reference to FIG. 3, the threshold of similarity may, in some embodiments, be based on a Damerau-Levenshtein distance analysis which may provide a count of the number of operations it would take to transform the description being processed into a description of an existing food record. Such a count may commonly be referred to as a distance between the description being processed and the description of the existing food record being processed. If the distance between the description being processed and the description of the existing food record are within a predefined distance from one another, then the description being processed and the description of the existing food record may be determined to be within a threshold of similarity one another. In such an instance, the determination in block 404 may be in the affirmative and the process may proceed to block 408. If, however, the determination of block 404 is in the negative, then the process may proceed to block 406 where the description, along with brand, country, etc. may be stored into a new food record of the food and beverages database. After the description of the food item being processed is stored at block 406, the process may proceed to block 416 where the process may end.

At block 408, a score for the description being processed may be determined. Such a score may be based on any factor that may be utilized to prioritize the description being processed. For example, the score may be based on additional information contained within the description being processed; the number of times the description being processed has been logged by a user; a measure of reliability of the source of the description (e.g., if the description were acquired from the FDA); the number of times the description being processed has appeared in the top results of recent searches, etc. Once a score for the description has been determined the process may proceed to block 410.

At block 410, a determination may be made as to whether the score calculated at block 408 is greater than the score of the current candidate record for the cluster associated with the existing record having a description within a threshold of similarity with the description being processed. If the score of the description being processed is less than, or equal to, the score of the current candidate record, then the process may proceed to block 412 where the description being processed, along with country, brand name, etc. may be added as a new record to the cluster. If, however the score of the description being processed is greater than the score of the current candidate record, then the process may proceed to block 414 where the description being processed, along with country, brand name, etc. may be added as a new record to the cluster and the new record may be set as the new candidate record for the cluster. Once the processing at block 414 has concluded, the process may proceed to block 416 where the process may end.

Figure 5:
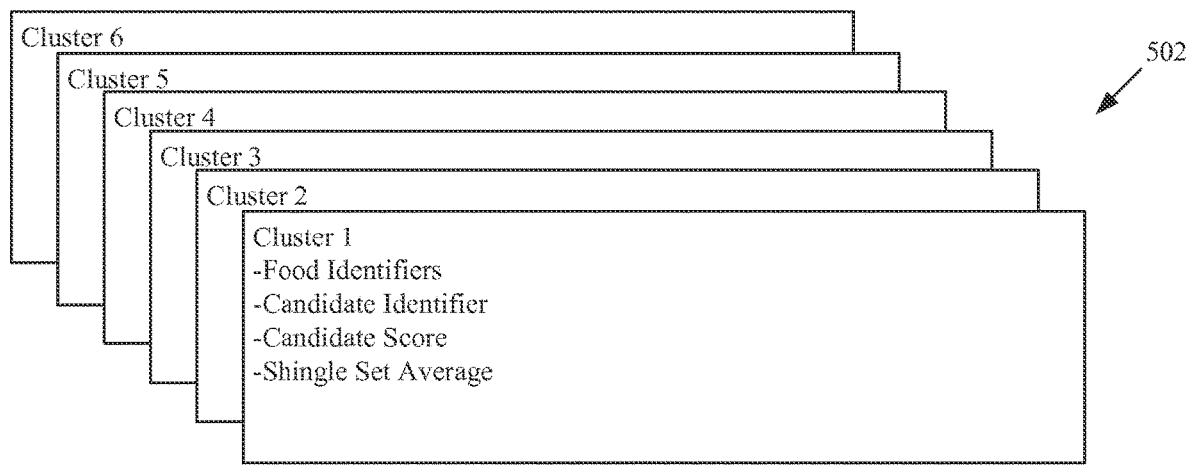
FIG. 5 illustrates example cluster records, according to the various embodiments.

FIG. 5 illustrates example cluster records 502 for clusters 1-5 in accordance with various embodiments of the present disclosure. As depicted, each cluster record may include a number of food identifiers to identify the records associated with the cluster. Each cluster may also include a candidate identifier that may identify the current candidate record associated with the cluster. In addition, the cluster record may, in some embodiments, include a score of the current candidate, such as the score discussed above in reference to FIG. 4. In addition, the cluster may, in some embodiments, include a count for the average shingle set of the various food records associated with the cluster.

Figure 6:
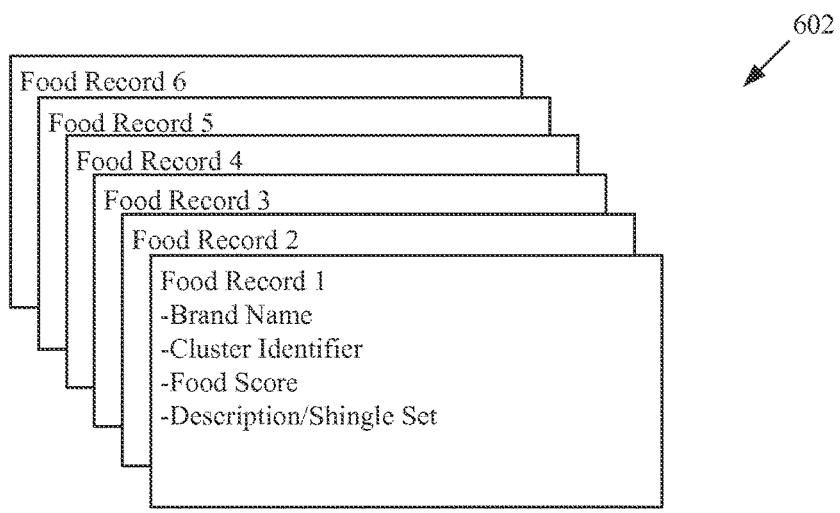
FIG. 6 illustrates example food records, according to various embodiments.

FIG. 6 illustrates example food records 1-6, in accordance with various embodiments of the present disclosure. As depicted, each food record 602 may include a brand name associated with the food record. In some embodiments, the food record may also include a cluster identifier that may identify the cluster to which the food record is associated. In some embodiments, the food record may also indicate a score associated with the food record, such as the score described above in reference to FIG. 4. Finally, each food record may include a description and or a shingle set associated with the food record, such as the shingle set discussed in reference to FIG. 4, above.

Figure 7:
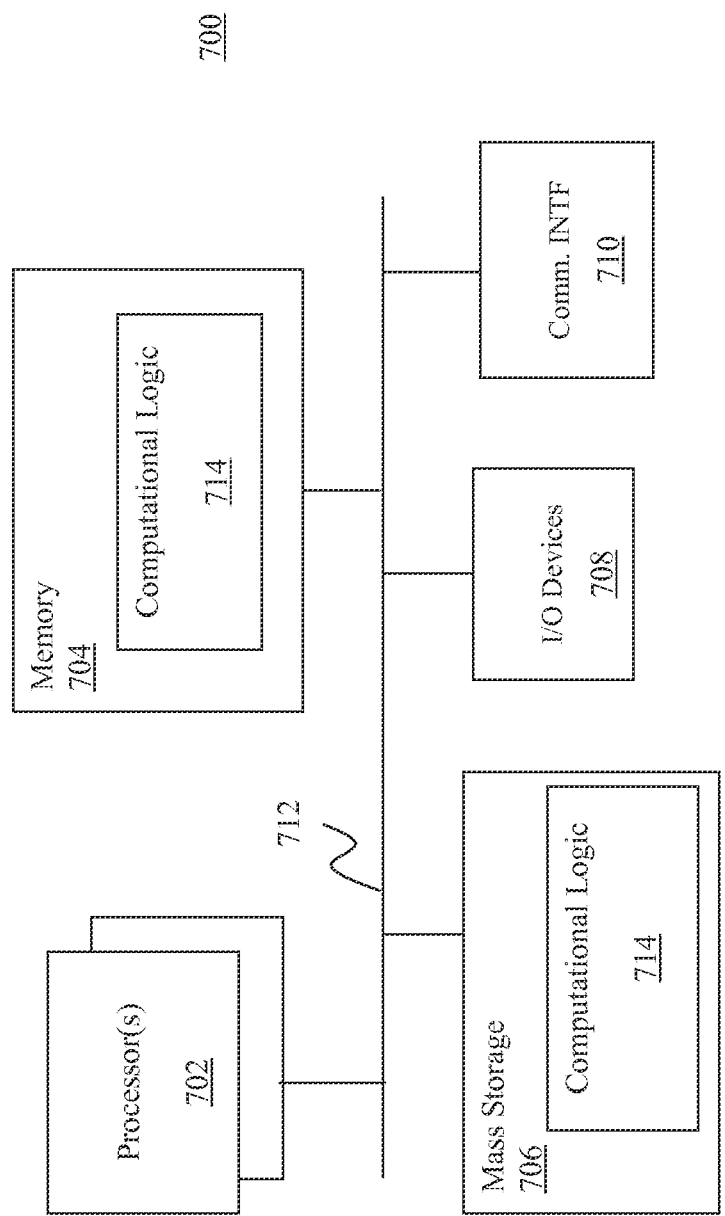
FIG. 7 illustrates an example computing system suitable for use as an interactive messaging computing device or a portable client device, according to various embodiments.

Referring now to FIG. 7, wherein an example computer suitable for use as server(s) 104 or client device 102 of FIG. 1, in accordance with various embodiments, is illustrated. As shown, computer 700 may include one or more processors or processor cores 702, and system memory 704. For the purpose of this application, including the claims, the terms "processor" and "processor cores" may be considered synonymous, unless the context clearly requires otherwise. Additionally, computer 700 may include mass storage devices 706 (such as diskette, hard drive, compact disc read only memory (CD-ROM) and so forth), input/output devices 708 (such as display, keyboard, cursor control and so forth) and communication interfaces 710 (such as network interface cards, modems and so forth). The elements may be coupled to each other via system bus 712, which may represent one or more buses. In the case of multiple buses, the buses may be bridged by one or more bus bridges (not shown).

Each of these elements may perform its conventional functions known in the art. In particular, when used as server(s) 104, system memory 704 and mass storage devices 706 may be employed to store a working copy and a permanent copy of the programming instructions implementing the operations associated with fitness management application 112 and pre-processing engine 124 of FIG. 1, above, collectively referred to as computational logic 722. The various elements may be implemented by assembler instructions supported by processor(s) 702 or high-level languages, such as, for example, C, that can be compiled into such instructions.

The permanent copy of the programming instructions may be placed into permanent storage devices 706 in the factory, or in the field, through, for example, a distribution medium (not shown), such as a compact disc (CD), or through communication interface 710 (from a distribution server (not shown)). That is, one or more distribution media having an implementation of the agent program may be employed to distribute the agent and program various computing devices.

The number, capability and/or capacity of these elements 710-712 may vary, depending on whether computer 700 is used as server(s) 104 or client device 102. When used as client device 102, computing device 700 may be a smartphone, computing tablet, e-reader, ultrabook, or laptop. Otherwise, the constitutions of elements 710-712 are known, and accordingly will not be further described.

FIG. 8 illustrates an example computer-readable non-transitory storage medium having instructions configured to practice all or selected ones of the operations associated with earlier described fitness management application 112 and/or preprocessing engine 124 of FIG. 1, in accordance with various embodiments. As illustrated, non-transitory computer-readable storage medium 802 may include a number of programming instructions 804. Programming instructions 804 may be configured to enable a device, e.g., computer 800, in response to execution of the programming instructions, to perform, e.g., various operations of the processes described above in reference to FIGS. 1-4, e.g., but not limited to, the operations associated with pre-processing engine 124. In alternate embodiments, programming instructions 804 may be disposed on multiple computer-readable non-transitory storage media 802 instead. In alternate embodiments, programming instructions 804 may be disposed on computer-readable transitory media 802, such as, signals.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A system comprising:
a preexisting database of crowd-sourced food records, the crowd-sourced food records including descriptions of associated food items previously entered by a plurality of first users;
one or more processors; and
a food data pre-processing engine, which, when operated by the one or more processors, limits the number of crowd-sourced food records in the database by causing the system to:
receive a description of a food item entered by a second user;
compare the user entered description to the preexisting database, the comparison comprising:
division of the user entered description into a plurality of component words;
elimination of unnecessary ones of the plurality of component words;
standardization of remaining ones of the plurality of component words of the user entered description via removal of special characters or features therefrom; and
determination of a single distance between the standardized remaining ones of the plurality of component words and respective component words of a description field for each of the food items associated with the food records in the preexisting database;
when the distance indicates that the user entered description comprises a distinct food item having a description that is outside a threshold of similarity to an existing food record, store the standardized description of the food item in the preexisting database, wherein storage of the standardized description includes addition of the standardized description as a new food record to a cluster associated with the existing food record, and wherein the addition of the standardized description as a new food record to the cluster comprises (i) determination of a score associated with the standardized description, wherein the score is calculated based at least in part on a number of times the food record has been logged or a number of times the food record appeared in recent searches of the database, (ii) storage of the standardized description as a new food record of the cluster, and (iii) designation of the new food record as a new candidate record representative of the cluster based on a result of the determination of the score; and
when the distance indicates that the user entered description of the food item is within a threshold of similarity to an existing food record in the preexisting database, merge the standardized description with the existing food record.

2. The system of claim 1, wherein the removal of special characters comprises at least one of:
removal of punctuation from the description;
removal of usernames from the description; and
removal of a country name from a food name contained within the description.

3. The system of claim 1, wherein at least one of the component words comprises a brand name and the standardization comprises causing the user entered description to match a description provided by a brand owner.

4. The system of claim 3, wherein when it is determined that the distance between the standardized remaining ones of the plurality of component words and the respective component words of one of the food items in the preexisting database is within a predefined threshold of similarity and is therefore identifying a same food item, the merge further comprising identification of the user entered description of the food item as a variant of the food item in the preexisting database.

5. The system of claim 1, wherein the description includes nutritional information associated with the food item.

6. The system of claim 1, wherein food includes beverage.

7. The system of claim 1, wherein the preexisting database comprises a cloud data storage arrangement.

8. The system of claim 1, wherein when the distance indicates that a duplicate food record exists in the preexisting database, omitting to store the standardized or normalized description.

9. The system of claim 1, wherein the standardization further comprises uniformly applying or omitting to apply capitalization of the remaining ones of the plurality of component words.

10. A method of limiting a number of records in a preexisting database of crowd-sourced food records, the method comprising:
   receiving, at a food data pre-processing engine of a fitness management system, a description of a food item entered by a user at a user device;
   processing, by the food data pre-processing engine, the description, wherein the processing includes comparing the user entered description to the preexisting database of crowd-sourced food records, the crowd-sourced food records including descriptions of food items previously entered by a plurality of first users, wherein the comparing includes:
      dividing the user entered description into a plurality of component words,
      eliminating unnecessary ones of the plurality of component words,
      standardizing remaining ones of the plurality of component words of the user entered description via removal of special characters or features therefrom, and
      determining a single distance between the standardized remaining ones of the plurality of component words of the user entered description and respective component words of food items in the database;
   determining, at the food data pre-processing engine, whether a previous record for the food item entered by the user exists within a food data storage arrangement of the fitness management system based on the distance, wherein the determination of whether a previous record for the food item entered by the user exists comprises determining whether the description of the food item is above a threshold of similarity to an existing food record;
   when it is determined that a previous record for the food item exists, using the description of the food item entered by the user to create a new record to be stored in a cluster of similar food records having descriptions for the same food item in the food data storage arrangement of the fitness management system, and storing the new record in the cluster of similar food records, wherein the act of storing comprises associating a score with the standardized description and subsequently designating the new record as a new candidate record of the cluster based on the score being the greatest score within the cluster, wherein the score is calculated based at least in part on a number of times the food record has been logged or a number of times the food record appeared in recent searches of the database; and
   when it is determined that a previous record for the food item does not exist, using the description of the food item entered by the user to create a new food record in the food data storage arrangement of the fitness management system.

11. The method of claim 10, wherein the act of processing comprises one or more of:
   removing punctuation from the description; removing usernames from the description;
   removing a country name from a food name contained within the description; and
   standardizing capitalization of the description.

12. The method of claim 10, wherein the act of processing further comprises:
   extracting, by the pre-processing engine, a brand name from the description; standardizing the brand name; and
   storing, by the preprocessing engine, the standardized brand name in a brand name field of a food record relating to the description.

13. The method of claim 12, wherein the act of processing further comprises:
   removing, by the pre-processing engine, special characters from the brand name to generate a standardized brand name; and
   identifying, by the pre-processing engine, a normalized brand name, from a list of normalized brand names, that is above a predefined threshold level of similarity to the standardized brand name.

14. The method of claim 10, wherein the description includes nutritional information associated with the food item.

15. The method of claim 10, wherein food includes beverage.

16. The method of claim 10, wherein the determination of whether a previous record for the food item entered by the user exists within a storage arrangement of the fitness management system further comprises: determining a distance between the standardized remaining ones of the plurality of component words and respective component words of the food items in the preexisting database; and comparing the distance to a threshold value.

17. A non-transitory computer-readable storage media having instructions embodied thereon for limiting a number of records in a preexisting database of crowd-sourced food records, which, when executed by a processor of a computing device, cause the computing device to:
   receive a description of a food item entered by a user;
   compare the description entered by the user to a database comprising a plurality of crowd-sourced food records, the crowd-sourced food records including descriptions of food items previously entered by a plurality of other users, the comparison comprising:
      standardization of the description for the food item entered by the user; and
      determination of a similarity between the standardized description and respective
   ones of the descriptions for the food records in the database, wherein the similarity is based on a distance between the standardized description and text in a description field for the food record;
   when the standardized description is not determined to be within a threshold level of similarity to at least one of the descriptions in the database, store the standardized description as a new record in the database; and
   when the standardized description is determined to be within a threshold level of similarity to at least one of the descriptions in the database:
      determine a score associated with the standardized description, wherein the score is calculated based at least in part on a number of times the food record has been logged or a number of times the food record appeared in recent searches of the database;
      save the standardized description as a new food record of a cluster of records each associated with the at least one description in the database; and
      when the score is above a given threshold, designate the new food record as one of a plurality of candidate records of the cluster, the candidate records comprising one or more records having descriptions to which the standardized description is compared.

18. The non-transitory computer-readable storage media of claim 17, wherein the standardization further comprises at least one of removal of punctuation from the description;
removal of usernames from the description;
removal of a country name from a food name contained within the description; and
uniform application of capitalization of the description.

19. The non-transitory computer-readable storage media of claim 17, wherein the standardization further comprises at least one of:
extraction of a brand name from the description;
amendment of the brand name to generate a standardized and normalized brand name; and
storage of the standardized and normalized brand name in a brand name field of the food record.

20. The non-transitory computer-readable storage media of claim 19, wherein the standardization further comprises at least one of:
removal of special characters from the brand name to generate a standardize brand name; and
identification of a normalized brand name, from a list of normalized brand names, that is above a predefined threshold of similarity to the standardized brand name as the standardized and normalized brand name.

21. The non-transitory computer-readable storage media of claim 17, wherein the description includes nutritional information associated with the food item.

22. The non-transitory computer-readable storage media of claim 17, wherein food includes beverage.

23. The non-transitory computer-readable storage media of claim 17, wherein when the standardized description is determined to be within a threshold level of similarity to at least one of the descriptions in the database the instructions are further configured to when the score is below the given threshold, cause the computing device to merge the standardized description with an existing food record.

24. The non-transitory computer-readable storage media of claim 17, wherein the standardization of the description for the food item entered by the user further comprises:
division of the user entered description into a plurality of component words;
elimination of unnecessary ones of the plurality of component words; and
standardization of remaining ones of the plurality of component words of the user entered description via removal of special characters or features therefrom.

25. The non-transitory computer-readable storage media of claim 24, wherein the determination of the similarity between the standardized description and respective ones of the descriptions in the database further comprises a determination of a distance between the standardized remaining ones of the plurality of component words and respective component words of the food items in the preexisting database.

* * * * *